Figure 1:
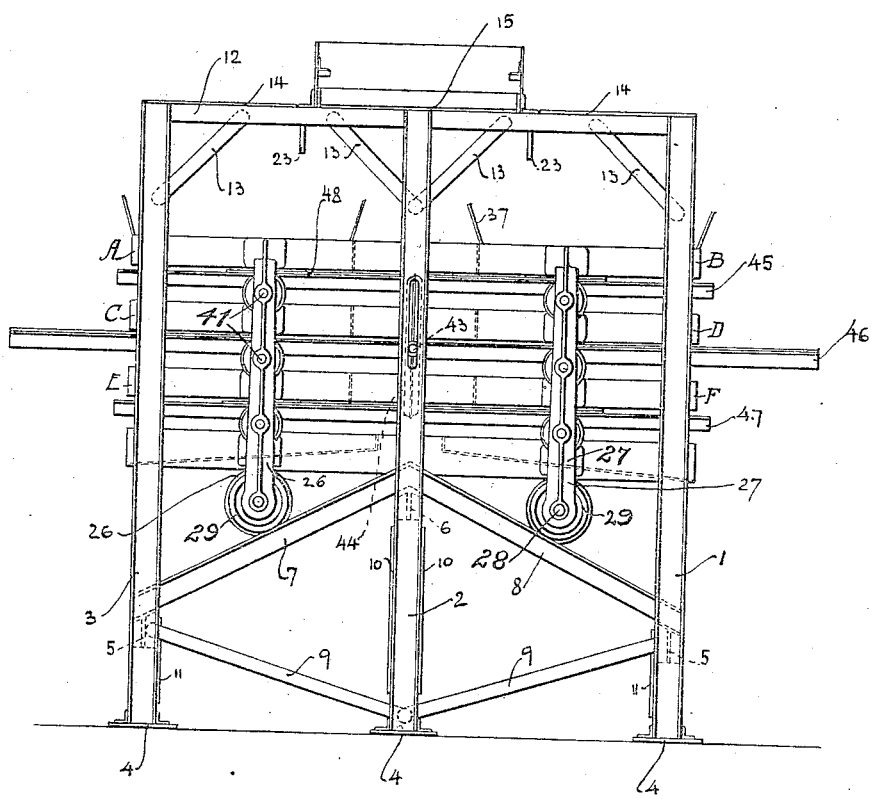

O. H. WECKESSER.
MIXING MACHINE.
APPLICATION FILED MAR. 26, 1909.

941,830.

Patented Nov. 30, 1909.
7 SHEETS—SHEET 1.

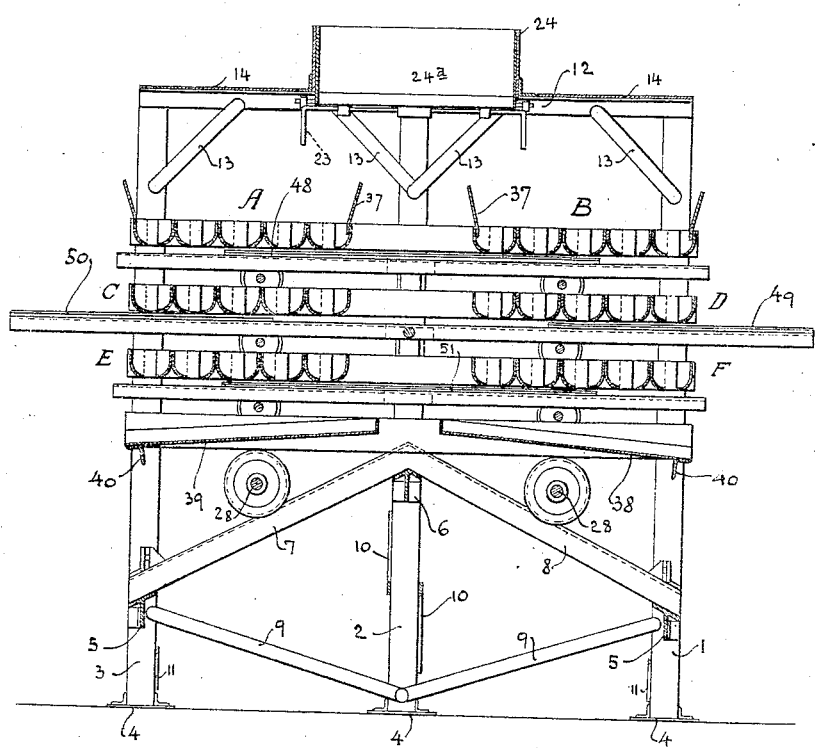

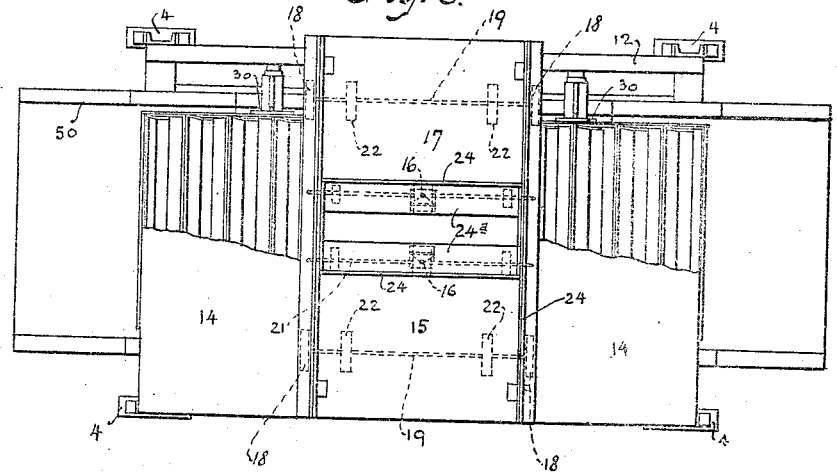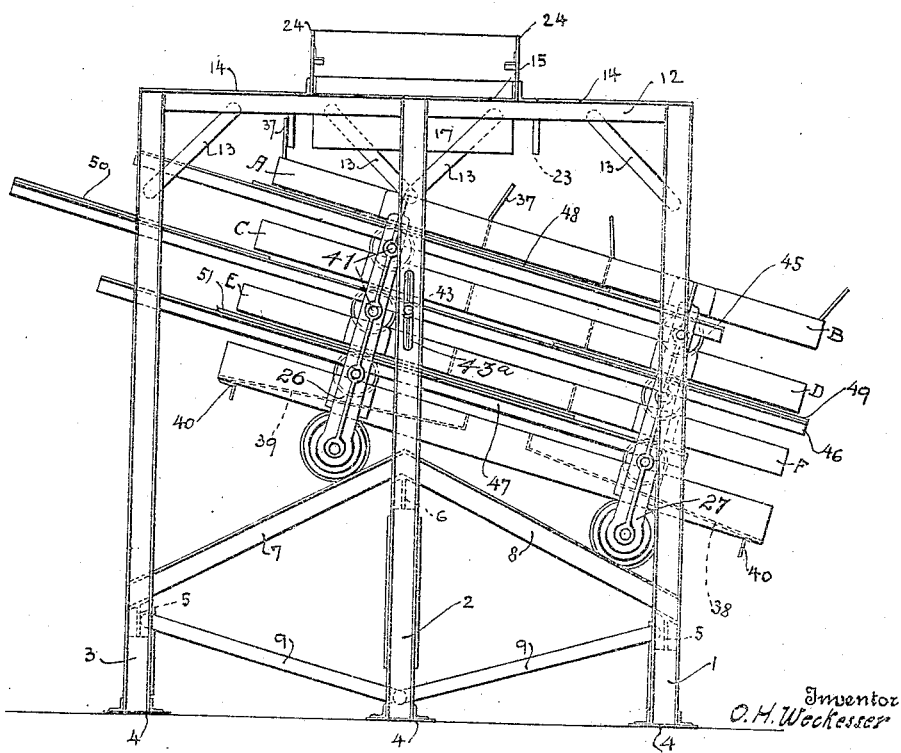

O. H. WECKESSER.
MIXING MACHINE.
APPLICATION FILED MAR. 26, 1909.
941,830.
Patented Nov. 30, 1909.
7 SHEETS—SHEET 4.
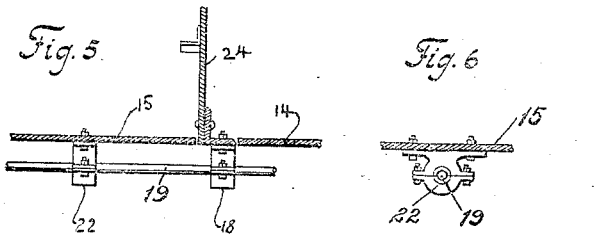
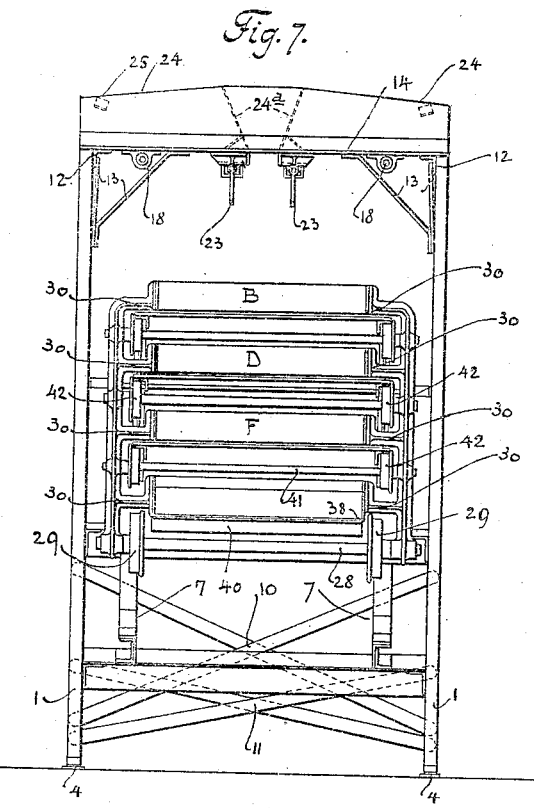

O. H. WECKESSER.
MIXING MACHINE.
APPLICATION FILED MAR. 26, 1909.
941,830.
Patented Nov. 30, 1909.
7 SHEETS—SHEET 5.
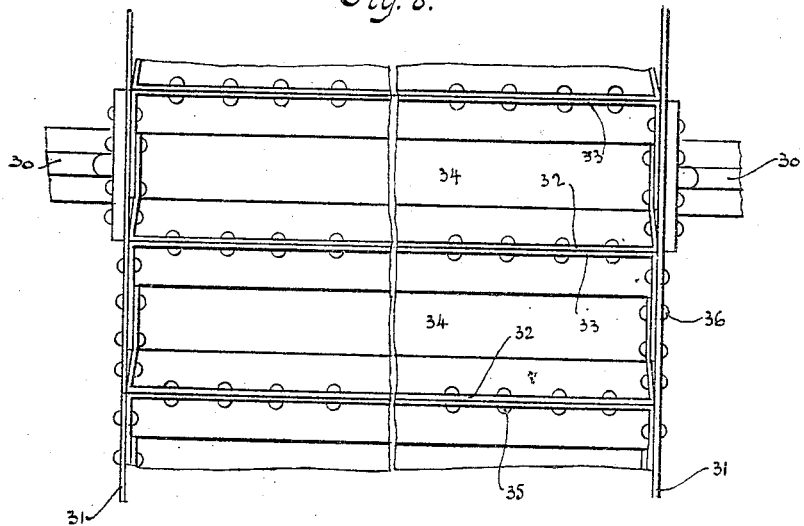
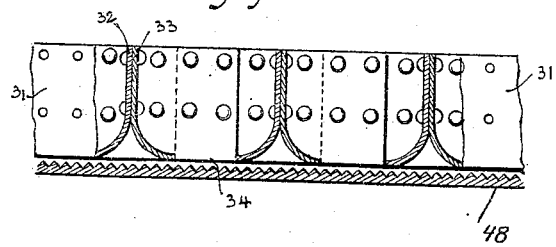
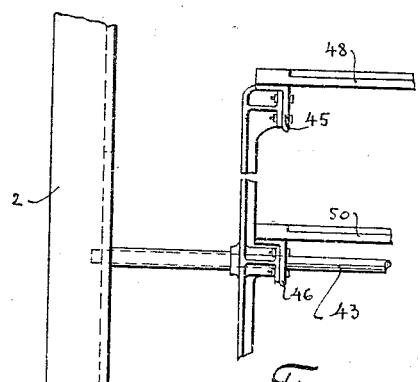
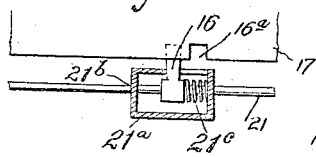
Witnesses
Frank Primmer
R. H. Butler
Inventor
O. H. Weckesser
By H. C. Everett
Attorneys

O. H. WECKESSER.
MIXING MACHINE.
APPLICATION FILED MAR. 26, 1909.

941,830.

Patented Nov. 30, 1909.
7 SHEETS—SHEET 6.

Witnesses
Samuel Payne

Inventor
O. H. Weckesser
By H. C. Evert & Co.
Attorneys

O. H. WECKESSER.
MIXING MACHINE.
APPLICATION FILED MAR. 26, 1909.

941,830.

Patented Nov. 30, 1909.
7 SHEETS—SHEET 7.

Witnesses
Samuel Payne
N. Louis Boggs

Inventor
O. H. Weckesser
By H. C. Evert & Co
Attorneys

UNITED STATES PATENT OFFICE.

OSCAR H. WECKESSER, OF ROSS TOWNSHIP, ALLEGHENY COUNTY, PENNSYLVANIA.

MIXING-MACHINE.

941,830.　　　　　Specification of Letters Patent.　　Patented Nov. 30, 1909.

Application filed March 26, 1909. Serial No. 485,916.

*To all whom it may concern:*

Be it known that I, OSCAR H. WECKESSER, a citizen of the United States of America, residing at Ross township, in the county of Allegheny and State of Pennsylvania, have invented certain new and useful Improvements in Mixing-Machines, of which the following is a specification, reference being had therein to the accompanying drawing.

This invention relates to mixing machines, particularly designed for thoroughly mixing the ingredients entering into the make-up of concrete, plaster and similar compositions and the object thereof is to provide a machine of such class with gravity operable means in a manner as hereinafter set forth for thoroughly admixing sand, cement and gravel, or other ingredients, thereby overcoming the necessity of employing rotary mixing devices, and a prime mover, such as steam or electrical power, to operate the means which thoroughly admixes the various ingredients entering into the make-up of concrete, plaster or similar compositions.

The invention further aims to provide a mixing machine for the purpose set forth provided with gravity operable means for thoroughly mixing sand, cement and gravel or other similar ingredients with or without the addition of water, whereby a prepared concrete or composition will be discharged from the machine for immediate use, thereby obtaining a saving in labor and furthermore a saving in the cost of power as is evident.

Further objects of the invention are to provide a mixing machine for the purpose set forth which shall be simple in its construction, strong, durable, efficient in its use, quickly performing the mixing operation for the ingredients, readily set up and comparatively inexpensive to manufacture.

With the foregoing and other objects in view, the invention consists of the novel construction, combination and arrangement of parts as hereinafter more specifically described and illustrated in the accompanying drawings, and set forth in the claims wherein is shown the preferred embodiment of the invention, but it is to be understood that changes, variations and modifications can be resorted to which come within the scope of the claims hereunto appended.

Figure 12:
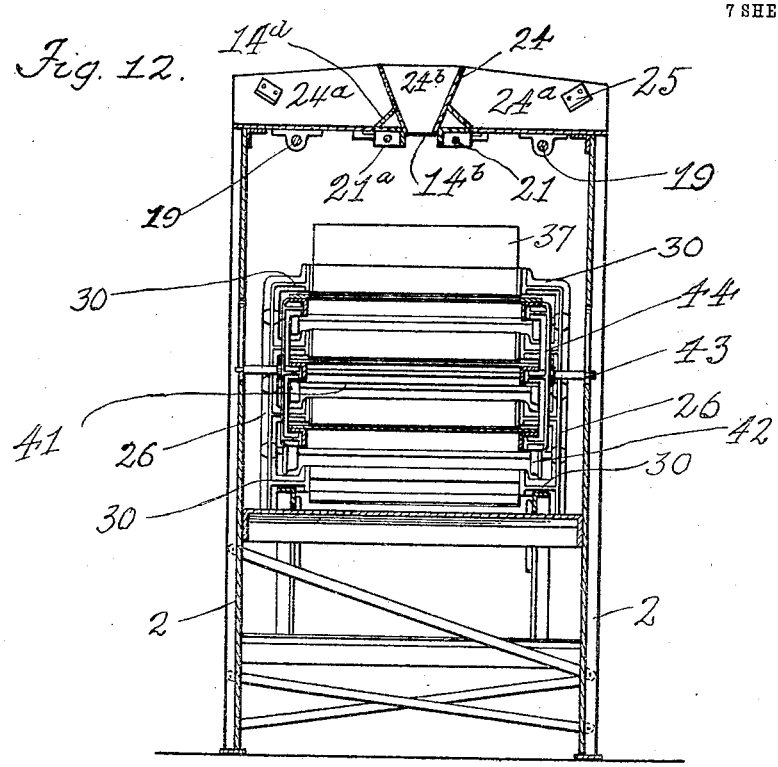
Figure 13:
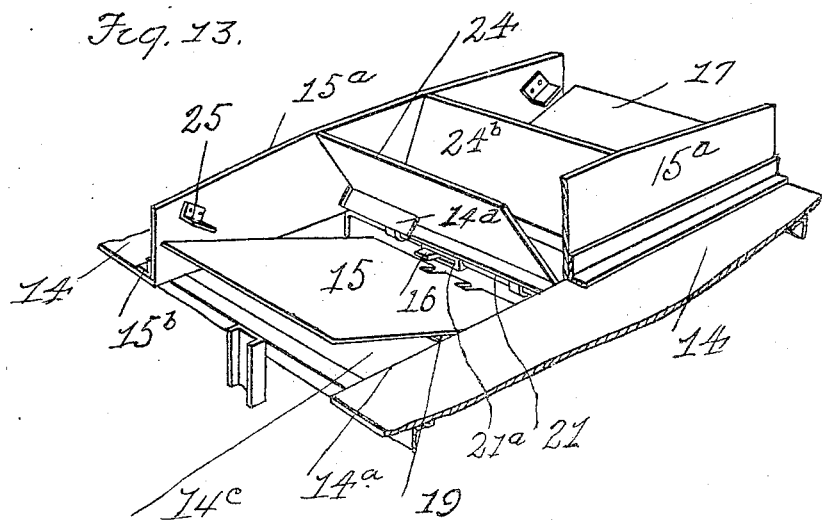
Figure 14:
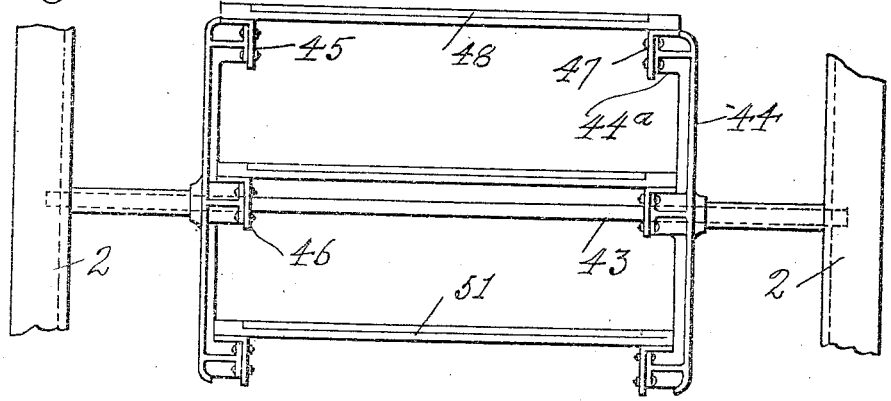
Figure 15:
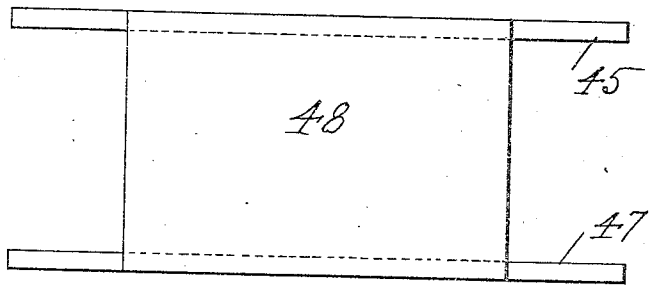
Figure 16:
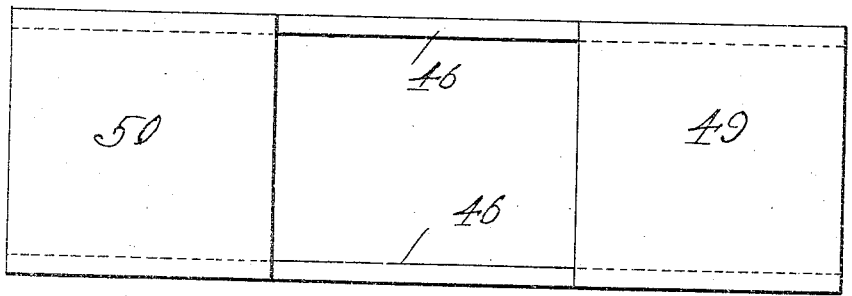

In the drawings, wherein like reference characters denote corresponding parts throughout the several views: Figure 1 is an elevation of the concrete mixer, Fig. 2 is a vertical longitudinal sectional view of the same, Fig. 3 is a plan of the machine with the loading platform thereof partly broken away, Fig. 4 is a side elevation of the machine with the carriers and bottom plates thereof shifted and tilted, Fig. 5 is a vertical sectional view of a portion of the loading platform illustrating one of the discharge doors thereof, Fig. 6 is a detail sectional view of the same, Fig. 7 is an end view of the concrete mixer, Fig. 8 is an enlarged plan of a portion of one of the shifting carriers, Fig. 9 is an enlarged longitudinal sectional view of a portion of one of the carriers, Fig. 10 is a detail view showing one end of the parts illustrated in Fig. 14. Fig. 11 is a detailed sectional view of a latch for the discharge doors of the machine, Fig. 12 is a cross-sectional view of the machine, Fig. 13 is a perspective view of the top of the machine, the platform being broken away, Fig. 14 is an elevation of one of the tilting heads, Fig. 15 is a plan of one of the mixing tray bottoms, and, Fig. 16 is a plan of another of the mixing tray bottoms.

The concrete mixing machine in its entirety is constructed of strong and durable metal consisting of castings, angle-bars, braces and frames, which are assembled to provide a rigid equi-balanced machine. The machine is made of a sufficient size to permit of a large quantity of concrete being mixed and discharged into a wheelbarrow or trough placed in position to receive the concrete. In connection with the machine it is possible to increase the height of the frame thereof and provide as many mixing units as may be desired, the number to be regulated by the capacity of each unit. The stability of the machine permits of the same being steadily operated, and the operation of the machine is such, that the concrete can be quickly mixed and discharged for immediate use.

*Machine frame.*—The frame comprises two parallel sets of vertical standards, each set of standards consisting of vertical channel bars 1, 2 and 3 erected upon suitable bed plates 4. The channel bars 1, 2 and 3 are connected by transverse tee-beams 5 and 6, the beams 6 connecting the channel bars 2 being located at a greater elevation than the beams 5 connecting the channel bars 1 and 3. Secured at their upper ends to the beams 6 and at their lower ends to the beams 5 are angle-bars constituting rails 7 and 8, the said rails extending downwardly at an inclination, and said rails 7 and 8 form tracks for a movable carriage to be hereinafter referred to. The channel bars 1, 2 and 3 are connected below the rails 7 and 8 by longitudinal braces 9, and by transverse diagonally disposed braces 10 and 11, the braces 10 connecting the channel bars 2 and the braces 11 the channel bars 1 and 3. Connecting the upper ends of the channel bars 1, 2 and 3 are longitudinal angle-bars 12, said bars being braced by angularly disposed brackets 13.

*The loading platform.*—Mounted upon the angle-bars 12 is a horizontally extending rectangular plate 14 which constitutes a loading platform. The plate 14 is cut-away intermediate its ends at both sides whereby there is remaining a portion of the plate as at 14$^b$, said portion 14$^b$ is arranged centrally and constitutes what may be termed a coupling piece 14$^b$ between the end portions of the platform. The cutting away of the plate 14 provides a pair of openings 14$^c$ constituting clearances to allow of the operation of a pair of counter-balancing dumping plates or trays 15 and 17. Connected to the plate 14 at the transverse edges of the openings 14$^c$ are the vertically disposed and transversely extending plates 15$^a$. Connected to the coupling piece 14 at each side thereof are the upwardly and outwardly extending inclined plates 24. The plates 15 and 24 in connection with the dumping plates 15 and 17 provide a pair of bins 24$^a$, the plates 15 and 17 constitute dumping bottoms for the said bins 24$^a$. The central portions of the plates 15$^a$ in connection with the plates 24 and the coupling piece 14$^b$ provide a bin 24$^b$. The bottom of the latter bin is formed by the coupling piece 14$^b$, the bottom being stationary. The bin 24$^b$ is adapted to contain cement which is mixed with the other ingredients of the mixture in the bins 24$^a$. The plates 15$^a$ are secured in position by the angle irons 15$^b$ and the plates 24 are braced through the medium of inclined members 14$^d$ which are secured to the plates 24 and to the coupling piece 14$^b$. As before stated the bin 24$^b$ is adapted to contain cement or any other ingredient which is to be combined with the other ingredients of the mixture, such other ingredients by way of example, being sand and gravel. The sand and gravel are supplied to the bins 24$^a$ after which the attendant who is standing upon the platform supplies from the bin 24$^b$ the requisite amount of cement to the bins 24$^a$.

Each side of the coupling piece 14$^b$ is provided with a latch 16 for holding the dumping plates in a closed position. Each of the latches 16 is carried by a shiftable bar 21 which extends through a boxing 21$^a$, the latter being provided with an opening 21$^b$ through which extends the latch 16 and interposed between the latch 16 and one end of the boxing 21$^a$ is a coil spring 21$^c$, the tendency of which is to maintain the latch 16 against one end wall of the opening 21$^b$ (see Fig. 11). Each of the rods 21 has its ends angularly disposed as at 23 so as to provide what may be termed projections adapted to be engaged by the deflectors 37 carried by the top tray of the gravity shiftable trays to be presently referred to, the said deflectors shifting the rods 31 so as to position the latches 16 to allow of the dumping of the plates 15 and 17, the position of the latches in this particular being in alinement with the notch 16$^a$ in the dumping plate (see Fig. 11), the dumping plate can then swing downwardly to discharge the load after which the plate swings upwardly and clears the latch 16, at this time the deflector is free of an end 23 of the rod 21; the spring 21$^c$ then expands and shifts the latch away from the notch 16$^a$ and underneath the plate whereby the plate is sustained in a closed position. To limit the opening movement of the plates or doors 15 and 17, each of the plates 15$^a$ is provided upon its inner face at each end with an inclined stop 25 (see Figs. 12 and 13). The bin 24$^b$ is adapted to contain cement which is admixed with the other ingredients forming the concrete, said other ingredients preferably being sand and gravel, which are placed in the bins 24$^a$.

*The movable carriage and shiftable trays.*—The carriage comprises two sets of vertical castings 26 and 27 and in the lower ends of said castings are journaled axles 28 having flanged wheels 29, the wheels of the casting 26 being adapted to travel upon the rails 7, while the wheels of the casting 27 are adapted to travel upon the rails 8. Each set of castings is provided with inwardly projecting arms 30 to which are secured tiltable superimposed mixing trays. Each tray comprises longitudinal parallel side plates 31 connected by transverse curved plates 32 and 33, the arrangement of these plates providing transverse openings 34. The backs of the plates 32 and 33 are riveted together, as at 35, while the ends of the plate 32 overlap the ends of the plate 33, and these overlapped ends are riveted, as at 36, to the side plates 31. The arrangement and formation of the plates 32 and 33 provide each tray with two groups of transversely extending pockets, the groups for the uppermost tray are indicated by the reference characters A and B, the groups for the next tray by the reference characters C and D, and the groups for the other tray by the reference characters E and F. Although the three mixing trays are shown, yet it is evident that the number of mixing trays can be increased or diminished if desired. The groups of pockets are arranged at each end of their respective tray and the end pocket of each group is provided with a vertically extending inclined deflector 37. Arranged below the lowermost mixing tray are discharge trays 30ª each formed by a pair of side plates 30ᵇ connected together by the inclined chutes 38 and 39 respectively which are adapted to discharge the mixed material from the trays. To reinforce the ends of the discharge trays, transversely extending angle-bars 40 are secured to the bottom of the trays. Journaled in the castings of the carriers are transverse axles 41, having flanged wheels 42 adjacent to said castings, the object of which will presently appear.

*Tilting heads.*—A pair of tilting heads are employed and which are adapted to carry the bottoms for the mixing trays, said bottoms tilting with the heads so as to change the relative position of the trays with respect to their bottoms. The tilting heads are best shown in Fig. 14 and each consists of an upright member 44 provided with three inwardly extending lugs 44ª. When three mixing trays are employed, each head 44 is provided with three lugs. The number of lugs 44ª for each member 44 corresponds to the number of mixing trays employed. Secured to the intermediate lugs 44ª are the angle bars 46 and fixedly secured to the top of the bars 46 at each end thereof are the tray bottom plates 49 and 50 which are suitably spaced apart. The upper and lower lugs 44ª of one of the heads 44 have the angle irons 45 secured thereto and the upper and lower lugs of the other head 44 have the angle-irons 47 secured thereto. Fixedly secured to the opposing angle-irons 45, 47 are the tray bottom plates 48 and 51. The tilting heads are mounted upon a rock shaft 43 journaled in a slot 43ª formed in the channel bars 2. The plates 48, 49, 50 and 51 are transversely corrugated, as best shown in Fig. 9, the function of which being to assist the material in turning or shifting when discharging from the pockets of each tray.

The operation of the machine is as follows: The normal position of the elements being that as shown in Fig. 2, the groups of pockets are empty of material. To start the operation of mixing in connection with a machine of the construction set forth, the mixing trays, discharge trays and tilting heads are tilted manually to assume the position shown in Fig. 4, and when in such position, the group of pockets A are closed by the bottom plate 48, the group of pockets D by the bottom plate 49 and the group of pockets E by the bottom plate 51. When the trays are shifted to the position shown in Fig. 4, the deflector 37 operates the latches which associates with the dumping plate whereby the latter is released and the ingredients of the mixture are discharged into the pockets of the group A, the weight of the material over-balancing the position of the trays as shown in Fig. 4; causing the tilting of the heads on their pivot and further causing the tilting of the trays and the weight of the load will also cause the shifting of the carriage downwardly upon the track 7 carrying the trays therewith, the inclination of the trays being opposite to that as shown in Fig. 4, the tilting heads are also shifted to a position reverse of that shown in Fig. 4, the bottom plates also extend at an inclination, but in an opposite direction to that shown in Fig. 4. As the bottom plates start to incline downwardly in an opposite direction to that shown in Fig. 4, the carrier and the trays move therewith and the trays slide downwardly upon the angle bars 45, 46 and 47, the direction being opposite to that direction in which the trays as shown in Fig. 4 extend. The trays as they shift upon the angle-bars 45, 46 and 47 will cause the bottom plates to assume a different position with respect to the groups of pockets, that is to say, the pockets of the group A will successively open and the pockets of the group C will successively close; the group of pockets C receiving the material from the group of pockets A; the pockets of the group B will be successively closed while the pockets of the group D will successively open and the pockets of the group F successively close. As before stated, the material in the pockets of the group A will be discharged into the group of pockets C, during such discharge of material, a deflector 37 will shift the latches of the dumping door or plates. It will be assumed that the bins 24ª have been supplied with a batch of material, releasing the dumping plates and causing a discharge of material into the pockets of the group B, the pockets of the group B at this time being arranged in proximity to the dumping plates or doors 15 and 17 so as to receive the material when the plates are released. The material having been discharged in the pockets of the group B, the trays will be over-balanced so as to cause the tilting heads to shift by gravity and the trays will be caused to assume the position shown in Fig. 4 by gravity, during such operation the contents of the pockets of the group C will be discharged into the pockets of the group E and the contents of the pockets of the group B will be discharged in the pockets of the group D. The pockets of the group A will then be in a position to receive a load from off the dumping doors or plates 15, 17; when the material is discharged in the pockets of the group A, the trays will be overbalanced and shifted by gravity to a position opposite to that shown in Fig. 4. When in such position the pockets of the group B will be closed, the group A opened, and the contents thereof discharged into the group C, the group D will be opened and the contents thereof discharged into the group F, the group E will be opened and the contents thereof deposited upon the chute 39 from where it is discharged from the machine. The foregoing operation is continued as long as desired to thoroughly admix a series of ingredients to form a concrete mixture or substance. The operation of the machine as above described is continued as long as material is deposited into the group of pockets A or group of pockets B from the loading platform; if the supply is discontinued and should it be necessary to discharge what material remains in the trays, the trays can be manually operated as is evident.

It is obvious that the mixing trays will readily shift downwardly upon the angle-bars 45, 46 and 47 during the tilting of the heads 44, whereby the groups of pockets A, B, will be alternately closed and opened by the bottom plate 48, the group of pockets C, D, will be alternately closed and opened by the bottom plates 49 and 50 and the group of pockets E, F, alternately opening and closing by the bottom plate 51, and that the material when leaving one group and discharging into another will be shifted so as to thoroughly cause an admixing thereof. When the heads are tilted the bottom plates which are fixedly secured thereto shift in unison with the heads so at the same time the relative position of the trays and the bottom plates will change.

Having now described my invention what I claim as new, is:—

1. In a concrete mixer, a plurality of superposed tiltable material-receiving trays adapted to communicate with each other, a shiftable carriage for and connected to said trays and shifted by the weight of the material, said trays sliding in unison with the carriage, and tiltable bottom closures for the trays tilted by the weight of the load and adapted when tilted to change the relative position thereof with respect to the trays.

2. In a concrete mixer, a plurality of superposed tiltable material-receiving trays provided with pockets adapted to communicate with each other, a shiftable carriage for and connected to said trays and shifted by the weight of the material, said trays sliding with said carriage, and a tiltable element tilted by the weight of the load and provided with pocket closures whereby when said element is tilted the relative position of the pocket closures with respect to the trays will be changed.

with respect to the trays, whereby the pockets of the upper tray will be shifted clear of their respective bottom plates and the material discharged in the pockets of a lower tray, and a shiftable carriage for and connected to said trays and shifted by the weight of the material whereby a sliding movement is imparted to the trays so that the relative position with the bottom plates with respect to the trays will be changed.

4. In a concrete mixing machine, a plurality of tiltable material-receiving trays, each provided with a plurality of pockets, closures for the pockets of the trays, and means whereby said trays are tilted at an inclination and shifted in the direction of their length for moving the pockets of one tray clear of the closure therefor so that the material of said tray will be discharged into the pockets of an adjacent tray.

5. A machine of the type described comprising superposed tilted trays, each having an open bottom, and a tilting head provided with plates for closing the bottoms of certain of said trays when these latter are tilted.

6. In a concrete mixer, a plurality of superposed trays, each provided at one end with a group of pockets having the bottoms thereof open, said trays bodily tilted alternately in an opposite direction, and a tilting head provided with means shifting therewith and constituting closures for the bottoms of the trays, said means when said head is tilted shifting clear of certain of the groups of pockets whereby the material from one group of pockets of one tray will be deposited in the group of pockets of another tray.

7. In a concrete mixer, a plurality of superposed trays, each provided at one end with a group of pockets having the bottoms thereof open, said trays bodily tilted alternately in an opposite direction, and a tilting head provided with means shifting therewith and constituting closures for the bottoms of the trays, said means when said head is tilted shifting clear of certain of the groups of pockets whereby the material from one group of pockets of one tray will be deposited in the group of pockets of another tray, and a shiftable carriage for and connected to said trays and shifted by the weight of the material.

8. In a concrete mixer, a plurality of superposed trays, each provided at one end with a group of pockets having the bottoms thereof open, said trays bodily tilted alternately in an opposite direction, and a tilting head provided with means shifting there-tray, and a shiftable carriage for and connected to said trays and shifted by the weight of the material, and means arranged below the trays for discharging the concrete from the machine.

9. A concrete mixer comprising a frame, inclined rails carried by said frame, a shiftable carriage moving upon said rails, tiltable trays connected to the carriage, and tiltable bottom plates arranged between said trays to control the discharge of one tray into another.

10. A concrete mixer comprising a frame, inclined rails carried thereby, a carriage movable upon said rails, super-imposed tiltable trays connected to the carriage and adapted to be shifted from one side of said machine to the other by the carriage, and means interposed between said trays for controlling the discharge of one tray into another.

11. In a concrete mixer, a plurality of material-receiving trays, each provided at each end with a group of pockets having contracted discharge openings, the groups of pockets of one tray arranged over the group of pockets of another tray, means whereby said trays can be shifted, and a tilting head provided with means for closing certain of the groups of pockets and for opening the other groups of pockets when the trays extend at an inclination whereby the material from certain of the pockets will be discharged into other of the pockets.

12. A concrete mixer comprising inclined rails, a carriage movable thereon, super-imposed tiltable trays connected to the carriage, means interposed between said trays to control the discharge of the contents of one tray into another.

13. A concrete mixer comprising a frame, inclined rails carried thereby, a carriage slidable upon said rails, super-imposed tiltable trays connected to the carriage and shifted thereby, bins supported by said frame for discharging material into the uppermost tray, and means movable between said trays for controlling the discharge of the contents of said uppermost tray into the other of said trays.

14. A machine of the type described embodying a frame, inclined rails carried thereby, a carriage movable upon said rails, superimposed tiltable trays connected to the carriage and shifted thereby, each tray comprising two groups of pockets, and means arranged between said trays for controlling the discharge of one group of pockets of one tray into another group of pockets of another tray.

15. A machine of the type described embodying a movable carrier shifted by the weight of the load, tiltable trays connected to the carrier and shifted thereby, each tray comprising groups of pockets having open bottoms, and plates arranged between said groups of pockets for controlling the discharge of the contents of an upper group into a lower group.

16. A machine for the purpose set forth comprising a movable carriage shifted by the weight of the load, superposed tilted trays connected thereto having the ends thereof provided with pockets, and shiftable means for controlling the discharge of the pockets of one tray into the pockets of another tray.

17. In a mixing machine, super-imposed gravity movable trays having the ends thereof provided with pockets and adapted to be shifted at an inclination, shiftable means arranged below the trays for controlling the discharge of the pockets of one tray into the pockets of another tray, and a carriage for said trays.

18. In a mixing machine, super-imposed gravity movable trays having the ends thereof provided with pockets and adapted to be shifted, shiftable means arranged below the trays for controlling the discharge of the pockets of one tray into the pockets of another tray, a movable carriage connected to the trays and adapted to shift them at an inclination, and means arranged below said shiftable means for automatically discharging the concrete from the machine.

19. A concrete mixing machine embodying a frame, rails supported by said frame, gravity trays movably arranged upon said rails, and bottom plates arranged between said trays and movable with said trays for alternately causing the ends of one tray to discharge into the ends of another tray.

20. A concrete mixing machine, embodying a frame, rails supported thereby, castings movable upon said rails, trays supported by said castings, each tray comprising groups of pockets, and bottom plates arranged between said trays and movable independent thereof for controlling the discharge of material from the pockets of one tray into the pockets of another tray.

21. A concrete mixing machine, embodying a frame, inclined rails supported by said frame, castings movably mounted upon said rails, superimposed trays supported by said castings, each tray comprising a group of pockets arranged at the ends thereof with the bottom of said pockets open, tilting heads trunnioned in said frame, and bottom plates supported by said heads between said trays for controlling the discharge of material from the bottoms of said pockets.

22. A concrete mixing machine, embodying a frame, inclined rails supported by said frame, castings movably mounted upon said rails, superimposed trays supported by said castings, each tray comprising a group of pockets arranged at the ends thereof with the bottom of said pockets open, tilting heads trunnioned in said frame, bottom plates supported by said heads between said trays for controlling the discharge of material from the bottoms of said pockets, and bins supported by said frame for discharging material into the pockets of said tray.

23. A concrete mixing machine, embodying a frame, inclined rails supported by said frame, castings movably mounted upon said rails, superimposed trays supported by said castings, each tray comprising a group of pockets arranged at the ends thereof with the bottom of said pockets open, tilting heads trunnioned in said frame, bottom plates supported by said heads between said trays for controlling the discharge of material from the bottoms of said pockets, bins supported by said frame for discharging material into the pockets of said trays, and discharge doors for controlling the discharge of said bins.

24. In a concrete mixing machine, a plurality of superposed trays, each provided at one end with a group of pockets having open bottoms, said trays being tiltable, a movable carriage connected to the trays and shifted by the weight of the load and shifting the trays therewith when the trays are tilted, inclined supporting means for said carriage, and shiftable means arranged below the trays for governing the discharge of the material from the pockets of one tray into the pockets of another tray when the trays are tilted and shifted by the carriage.

25. In a concrete mixing machine, a plurality of superposed trays, each provided at one end with a group of pockets having open bottoms, said trays being tiltable, a movable carriage connected to the trays and shifted by the weight of the load and shifting the trays therewith when the trays are tilted, inclined supporting means for said carriage, and shiftable means arranged below the trays for governing the discharge of the material from the pockets of one tray into the pockets of another tray when the trays are tilted and shifted by the carriage, and a tilting supporting means for said governing means.

26. In a mixing machine, tiltable trays having open bottoms, a shiftable means for controlling the discharge of the material from one tray to another tray, and means for shifting the trays at an inclination when the trays are tilted.

27. In a mixing machine, tiltable trays having open bottoms, a shiftable means for controlling the discharge of the material from one tray to another tray, and means for shifting the trays at an inclination when the trays are tilted, and a tiltable supporting means for said controlling means, said tiltable supporting means changing the position of said controlling means relative to the trays.

In testimony whereof I affix my signature in the presence of two witnesses.

OSCAR H. WECKESSER.

Witnesses:
K. H. BUTLER,
A. J. TRIGG.